United States Patent
Janky et al.

(10) Patent No.: US 6,512,928 B1
(45) Date of Patent: Jan. 28, 2003

(54) SLOW HOPPING DATA TRANSMITTER

(75) Inventors: James M. Janky, Los Altos, CA (US); Arthur E. Anderson, Sunnyvale, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 09/265,492

(22) Filed: Mar. 9, 1999

(51) Int. Cl.$^7$ ................................................ H04Q 7/20
(52) U.S. Cl. ...................... 455/456; 455/450; 455/509; 455/517; 370/341; 342/357.09; 342/357.1
(58) Field of Search ................................ 455/450–453, 455/456, 464, 466, 432, 436, 440, 509, 517, 525, 9, 67.1; 370/341, 343, 345, 346, 348, 350; 375/132, 138; 342/357.06, 357.09, 357.1

(56) References Cited

U.S. PATENT DOCUMENTS

| | | | | |
|---|---|---|---|---|
| 5,710,976 A | * | 1/1998 | Hill et al. | ................... 340/7.21 |
| 5,729,540 A | * | 3/1998 | Wegrzyn | .................... 370/336 |
| 5,765,112 A | * | 6/1998 | Fitzgerald et al. | .......... 340/10.3 |
| 5,809,427 A | * | 9/1998 | Perreault et al. | ............. 455/450 |
| 6,100,842 A | * | 8/2000 | Dreier et al. | ........... 342/357.01 |
| 6,343,254 B1 | * | 1/2002 | Kirk et al. | .............. 342/357.14 |

* cited by examiner

*Primary Examiner*—William Trost
*Assistant Examiner*—Simon Nguyen
(74) *Attorney, Agent, or Firm*—Wagner, Murabito & Hao LLP

(57) ABSTRACT

A method and apparatus for coupling data from a base station to a rover unit for determining the position of the rover unit. Multiple radio channels are monitored by the base station and a radio channel is assigned that is unoccupied. A RTK message is then transmitted by the base station that includes the assigned radio channel. The rover unit then monitors the assigned radio channel for the next RTK message. The assigned radio channel is periodically updated. Each following RTK message is transmitted over a previously assigned radio channel. This results in both the base station and the rover unit "hopping" from channel to channel for communicating the RTK message from the base station to the rover unit. The rover unit uses the received RTK message, along with signals from a position determination system, for determining position.

27 Claims, 13 Drawing Sheets

| 801 | Channel No. | 1 | 2 | 3 | 4 | 5 | 6 | 7 | 8 | 9 | 10 |
|---|---|---|---|---|---|---|---|---|---|---|---|
| 802 | Occupancy | .2 | .4 | .1 | .6 | .3 | .5 | .4 | .9 | .6 | .3 |
| 803 | Complement | .8 | .6 | .9 | .4 | .7 | .5 | .6 | .1 | .4 | .7 |
| 804 | Available? | Yes | Yes | Yes | No | Yes | No | Yes | No | No | Yes |

FIG. 8

SLOW HOPPING DATA TRANSMITTER

TECHNICAL FIELD

This invention relates to location determination systems. Specifically, the present invention relates to an apparatus and method for coupling data to a position determination device.

BACKGROUND ART

Conventional GPS position determination methods and Differential Global Positioning System (DGPS) position determination methods allow for the determination of position with sufficient accuracy for many applications. However, Real-Time Kinematics (RTK) methods are commonly used for applications that require a high degree of accuracy such as, for example, surveying.

RTK systems typically include a base station and one or more rover unit(s). The base station includes a GPS receiver and a radio transmitter that is coupled to the GPS receiver. The base station is located at a known position and communicates with the rover unit via radio. The rover unit includes a radio receiver that is adapted to receive communications from the radio transmitter of the base station and a GPS receiver. The base station periodically sends specially formatted data packets to the rover unit. These specially formatted data packets include GPS data received by the base station GPS receiver.

In a typical surveying application, the surveyor or the surveyor's assistant carries the rover unit to locations for which position is to be determined. The surveyor, or the surveyor's assistant then obtains GPS derived position fix data points using the GPS receiver of the rover unit. The rover unit uses, in real time, the data received from the base station in conjunction with GPS data received by the rover unit GPS receiver to determine position relative to the location of the base station GPS receiver within a horizontal accuracy of approximately plus or minus 2 centimeters. The rover unit stores the computed position fix in real-time for later use by the surveyor. In such prior art systems, the wireless data transmission path is one way from the base station to the rover(s).

In a typical surveying application, a surveyor locates the base station at his office, taking the rover unit out into the field to perform the required survey work. If the work area is beyond 50 kilometers from his office, the surveyor must create a new reference point near the work site using well-known survey techniques and the reference point must be chosen so as to assure adequate radio coverage of the site to be surveyed. That is, the reference point must be chosen such that the base station can communicate with rover unit(s) located within the area to be surveyed. It is often very desirable to locate the base station on a high point near or in the work site, in order to get the best radio range coverage possible.

The radios used for communication between the base station and the rover unit(s) are chosen by the surveyor from a small set of radios whose parameters (operating frequency and power) depend on the surveyor's political status. For example, government agencies have a set of frequency bands available to them that is different from the frequency bands that are available to civilian users. Some frequency bands that are available for civilian use are restricted with regard to transmission power level. This leads to varying coverage ranges, depending on the frequency band used. The ideal coverage range for a surveyor has a minimum of at least five kilometers and a maximum of about 50 kilometers. The maximum is set by RTK performance. That is, at a distance of over 50 kilometers, RTK position determination methods may not provide sufficient accuracy for particular surveying applications.

There are many distinct radio bands available to the surveyor, starting at 30–50 MHz and extending into the VHF range (220 MHz to 450–470 MHz, and 900 MHz). All available frequency bands with the exception of the 900 MHz band requires a license from the Federal Communications Commission (FCC) for permission to operate, and such operation is covered by Part 90 of the FCC rules and regulations. At 900 MHz, there is a special authorization under Part 15, that allows for spread spectrum transmissions with a restricted transmit power of less than one Watt. This low-power level severely limits the range of the radio, which was the FCC's intention in creating the service. The typical suburban range of a radio operating in the 900 MHz band is about two kilometers, with one kilometer being common.

Surveyors have gravitated towards the 450–470 MHz band because it is possible to obtain a FCC license for nationwide coverage with 35 Watt transmitters. This power level provides the five kilometer minimum coverage range that is needed for effective productivity. The 450–470 MHz band is authorized for primary use by occasional voice service, on a shared use basis with others in a particular service area. Typical users include taxi dispatch, maintenance and repair dispatch, and other business or government services that need occasional voice service and do not need access to a nationwide telecommunications service.

There is a section-of part 90 that permits use of the 450–470 MHz band for telemetry services, subject to some stringent restrictions. These restrictions include the requirement that telemetry users share the channel with other users. However, surveyors typically set up on a work site and start transmitting RTK data packets, which are typically broadcast once per second, with a duration of approximately 0.25–0.4 seconds, until the survey is complete. Thus, a particular channel is virtually occupied by the transient surveyor for a half day, up to as many as five days, depending on the magnitude of the survey job. The problem is severely exacerbated if the surveyor picks a radio channel for which there is a local area repeater system. In this event, if the data packets are picked up by the repeater system they are rebroadcast over a much larger area, thus rendering the particular channel completely useless over a large area. Even if the surveyor's signal is not repeated, the surveyor's strong signal may "capture" the repeater's receiver and thereby prevent voice users from using the repeater.

For the above reasons, a channel formerly used by local users can become unusable for the duration of the survey. When an established user, at his base of operations, cannot access the user's mobile fleet in a few seconds, his options are a few: wait until the channel clears, or reassign each radio in the fleet to a new channel. This is inconvenient and time consuming for the established user. This also can lead to complaints by the local established users to the FCC for failure to abide by the rules of operation established by the FCC that call for "sharing" the channel.

In recent years, the number of persons using licensed and unlicensed frequency bands for voice communications has increased dramatically, making these frequency bands crowded, congested and unavailable for use by GPS users. Also, persons using licensed and unlicensed frequency bands for voice communications tend to communicate during business hours and during certain times of the day. At these times, desirable frequency bands become highly congested, particularly in densely populated areas, making usage for surveying activities difficult if not impossible.

The FCC requires that voice users listen before they speak to assure that the channel is available. However, in many instances users do not listen for a sufficient amount of time. This often results in voice users talking over a surveyor's transmission. This can result in loss of data. If the voice usage is significant, the rover unit may not be able to determine position. In congested areas, this may force the surveyor to change to a less congested frequency band.

What is needed is a method and apparatus that will allow for more efficient use of available frequency bands. More particularly, a GPS system and a method for communicating is required that allows for efficient usage of available frequency bands. Also, a method and apparatus is needed that meets the above needs and that does not interfere with voice communication. In addition, a method and apparatus is needed that meets the above needs and that is inexpensive and easy to operate.

DISCLOSURE OF THE INVENTION

The present invention provides an apparatus and method for coupling position determination system data from a first position to a second position determination system that transmits over unoccupied channels. More particularly, the present invention provides a method and apparatus for monitoring channel usage, automatically selecting an unoccupied channel or sequence of channels for radio transmission of position determining system data and transmitting data over the unoccupied channel.

A position determining network that includes a base station and a rover unit are disclosed. Both the base station and the rover unit include a position determination system (PDS) receiver that is coupled to a PDS antenna for receiving data from a PDS. In one embodiment the PDS that is used is the US Global Positioning System (GPS) that is operated by the US Air Force. Alternatively, other PDS methods and systems can be used such as, for example the GLONASS, Pseudolites, etc.

The base station communicates with the rover unit through a radio that is adapted to receive and transmit over multiple channels. In one embodiment, the radio is adapted to transmit over unlicensed frequency bands. However, alternatively, licensed bands could also be used.

In operation, the base station receives PDS signals that include timing signals. The timing signals are then used by the base station to synchronize timing with the rover unit. This is performed by radio transmission over an established home channel. The base station then monitors multiple radio channels and generates a channel occupancy map that indicates the occupancy of the monitored channels. A channel selection algorithm is then used for determining available channel(s) and assigning one channel, or a sequence of channels for subsequent communications. In one embodiment, user defined channel preference factors are used in the channel selection algorithm for determining assigned channel(s).

A message is then generated that includes data from the received PDS signals and that indicates the assigned radio channel(s). The message is transmitted over the home channel to the rover unit. The rover unit then determines position using PDS signals received at the rover unit and the message received from the base station.

The next transmission is sent and received over the assigned radio channel that was determined to be unoccupied. The base station continues to monitor channel occupancy using subsequently generated channel occupancy maps. The assigned radio channel is updated periodically such that communication is maintained over an unoccupied radio channel. Each time that the assigned radio channel is updated, the updated assigned radio channel is indicated in the message transmitted by the base station.

The rover unit receives each assigned channel and moves to the assigned channel for receiving the next transmission from the base station. Thus, the base station and the rover unit move from channel to channel, communicating over unoccupied channels.

The method and apparatus of the present invention moves from channel to channel, communicating over unoccupied channels. This minimizes channel interference and channel congestion, providing for more efficient use of available frequency bands. By communicating over unoccupied channels, the method and apparatus of the present invention does not interfere with voice communication. In addition, the method and apparatus of the present invention is inexpensive and easy to operate.

These and other objects and advantages of the present invention will no doubt become obvious to those of ordinary skill in the art after having read the following detailed description of the preferred embodiments that are illustrated in the various drawing figures.

BRIEF DESCRIPTION OF THE DRAWINGS

The accompanying drawings, that are incorporated in and form a part of this specification, illustrate embodiments of the invention and, together with the description, serve to explain the principles of the invention.

FIG. 8 is a diagram illustrating an exemplary channel selection process using a channel selection algorithm in accordance with one embodiment of the present claimed invention.

Figure 1:
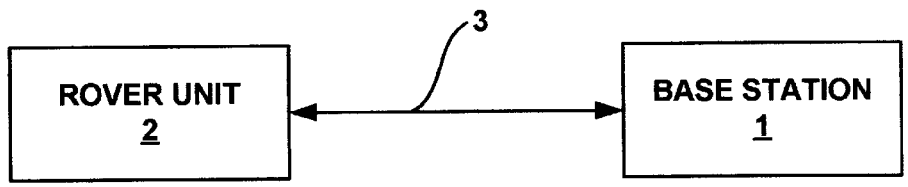
FIG. 1 is a diagram showing a rover unit and a base station in accordance with one embodiment of the present invention.

The drawings referred to in this description should be understood as not being drawn to scale except if specifically noted.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail as not to unnecessarily obscure aspects of the present invention.

Some portions of the detailed descriptions that follow are presented in terms of procedures, logic blocks, processing, and other symbolic representations of operations of data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "analyzing," "generating," "updating," "determining," "repeating," or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system's memories or registers or other such information storage, transmission, or display devices. Thus, the present invention is also well suited to the use of general purpose computer systems and other computer systems such as, for example, optical and mechanical computers.

FIG. 1 shows a base station 1 that is adapted to communicate with rover unit 2. Communication between base station 1 and rover unit 2, indicated by arrow 3, is conducted over licensed or unlicensed radio frequencies.

Figure 2:
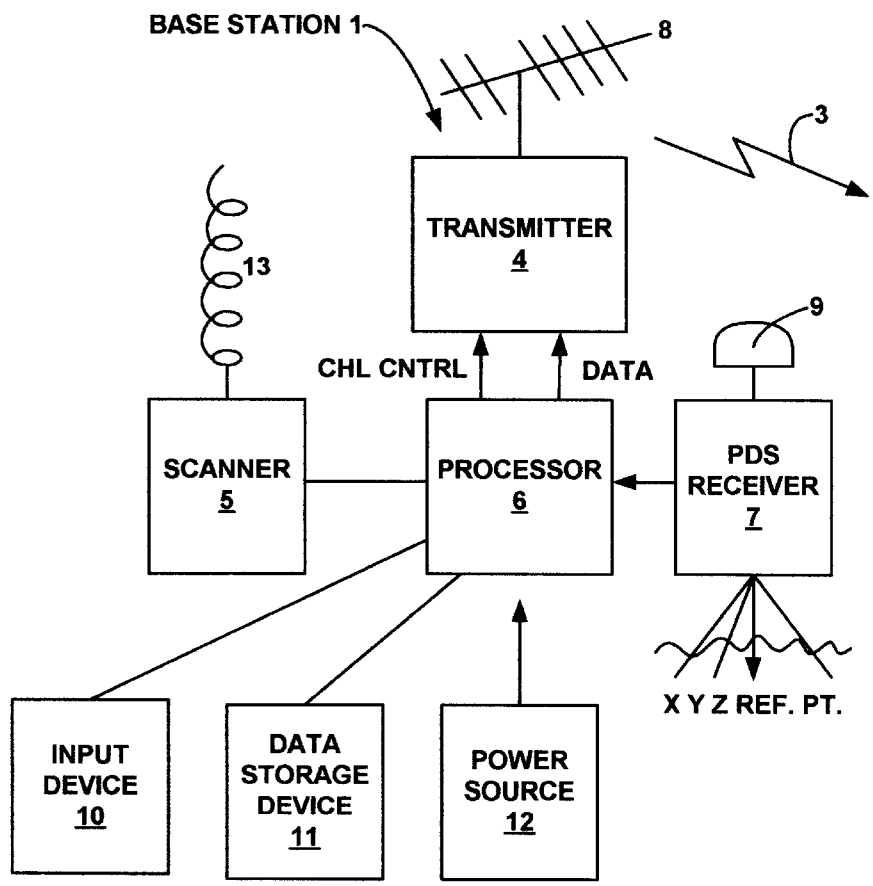
FIG. 2 is a schematic diagram of a base station in accordance with one embodiment of the present claimed invention.

Base station 1 of FIG. 2 includes processor 6 for controlling the operations of base station 1. In one embodiment, processor 6 is a general-purpose microprocessor that has low power consumption such as, for example, a MIPS R4K microprocessor made by Silicon Graphics Inc., of Mountain View, Calif. In one embodiment, a computer program (not shown) operates on processor 6 for controlling the operations of base station 1. Alternatively, processor 6 can be an Application Specific Integrated Circuit (ASIC) device or a Field Programmable Gate Array (FPGA) device that is programmed to perform the desired functions.

Data storage device 11 of FIG. 2 is coupled to processor 6 and is adapted to store data. Data storage device 11 may be any type of digital data storage medium. In one embodiment, data storage device 11 is a Random Access Memory (RAM) device such as, for example, a Static Random Access Memory (SRAM) device, a Dynamic Random Access Memory (DRAM) device or a flash memory storage device.

Continuing with FIG. 2, power source 12 provides power to the various components of base station 1. Power source 12 may be any portable power source. In one embodiment, power source 12 includes D cell batteries.

Input device 10 may be any device adapted to couple user input to processor 6. In one embodiment, input device 10 is an alphanumeric keypad that includes one or more function keys. However, alternatively, input device 10 could include a touchpad, joystick, mouse, etc that is usable in combination with a visible display for coupling user input to processor 6.

Continuing with FIG. 2, base station 1 also includes PDS receiver 7 that is adapted to receive transmissions from. a PDS via PDS antenna 9. PDS receiver 7 is coupled to processor 6 and is adapted to be located over a known reference point such as, for example, reference point $X_o Y_o Z_o$. In one embodiment, PDS receiver 7 is adapted to determine position using a Satellite Positioning System such as the U.S. Global Positioning System (GPS). In the present embodiment, reference to a position determination system herein refers to a Global Positioning System (GPS), to a Global Orbiting Satellite System (GLONASS), and to any other positioning system, including pseudolites and dead reckoning systems, that provides information by which an observer's position can be determined. The term "position determination system" and "PDS" as used herein, is intended to include pseudolite or equivalents of pseudolites, and the term "position determination system signals" and "PDS signals," as used herein, is intended to include position determination system-like signals and data from pseudolites or equivalents of pseudolites. Also, signals from other sources such as LORAN, Wide Area Augmentation System (WAAS) satellites, etc. may be used to determine position. The position determination system may also provide information by which an observer's velocity and/or the time of observation can be determined.

Continuing with FIG. 2, in one embodiment, PDS receiver 7 is a commercially available PDS receiver, manufactured by Trimble Navigation, Ltd. of Sunnyvale, Calif. However, any of a number of other commercially available PDS receivers could be used.

Referring still to FIG. 2, base station 1 includes scanner 5 and radio transmitter 4 that are coupled to processor 6. Radio transmitter 4 transmits data over multiple radio channels via radio antenna 8. Data may be transmitted using any of a number of different transmission methods and formats. Scanner 5 receives multiple radio channels over antenna 13.

Figure 3:
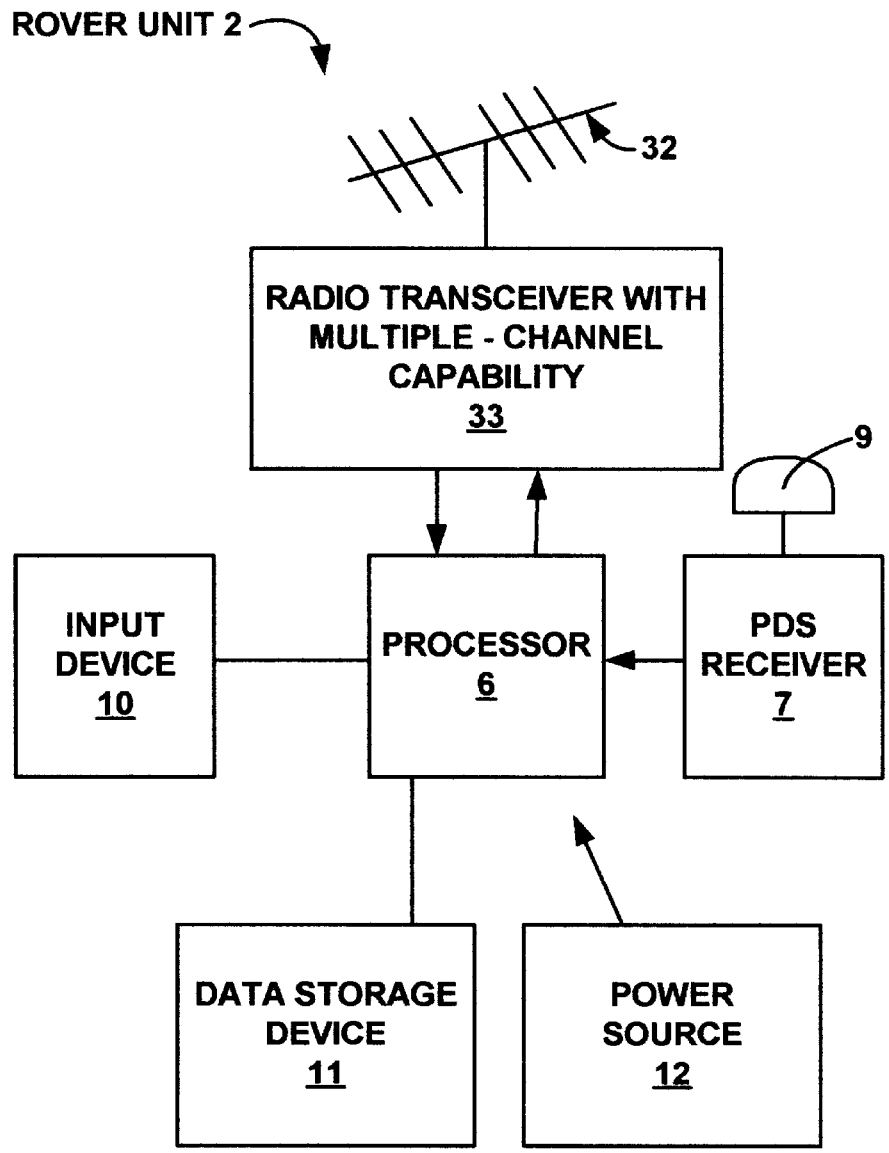
FIG. 3 is a schematic diagram of a rover unit in accordance with one embodiment of the present claimed invention.

Referring now to FIG. 3, an embodiment of an exemplary rover unit 2 is shown to include a radio transceiver 33 that receives and transmits via radio antenna 32. Radio transceiver 33 is adapted to send and receive data over multiple radio channels such that radio transceiver 33 can receive transmissions from data transmitter 4 of FIG. 2 and can send transmissions to scanner 5 of FIG. 2. Although transceiver 33 is shown to be a single component, alternatively, a separate receiver and transmitter could be used, or simply a receiver.

Continuing with FIG. 3, PDS receiver 7 and PDS antenna 9 are adapted to receive PDS signals that are coupled to processor 6. Rover unit 2 also includes an input device 10 that is adapted to couple user input to processor 6, a power source 12, and a data storage device 11.

Figure 4:
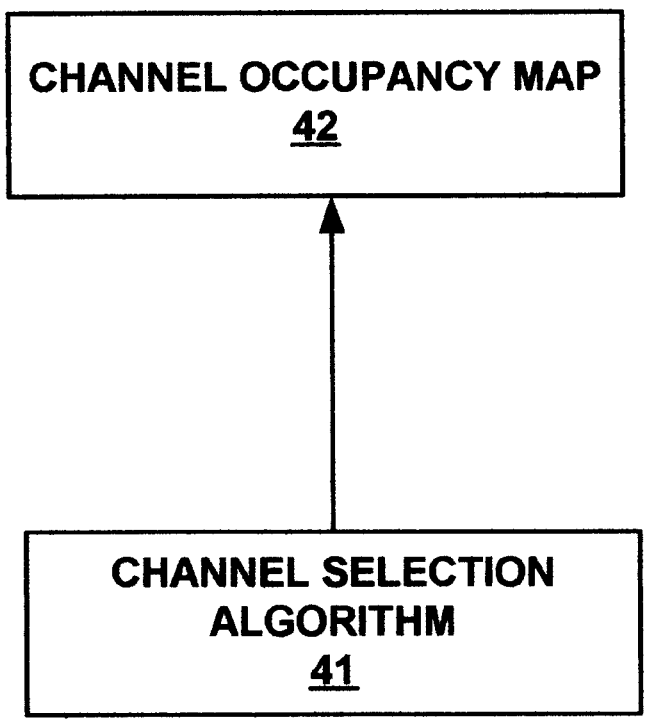
FIG. 4 is a schematic diagram showing a channel occupancy map and a channel selection algorithm in accordance with one embodiment of the present claimed invention.

Referring now to FIG. 4, channel occupancy map 42 is a matrix that indicates the occupancy of radio channels. In one embodiment, channel occupancy map 42 is a data file that is generated by processor 6 of FIG. 2 and that is stored in data storage device 11 of FIG. 2. Alternatively, channel occupancy map 42 can be stored in data storage registers of processor 6.

Referring still to FIG. 4, a channel selection algorithm 41 is shown. Channel selection algorithm 41 is adapted to determine available channel(s). Channel selection algorithm 41 uses data from channel occupancy map 42 for determining whether radio channels are occupied and for assigning radio channels. In one embodiment, channel selection algorithm 41 is an algorithm that is adapted to run on processor 6 of base station 1 of FIG. 2 for determining available channel(s) and for assigning channel(s). In one embodiment, channel selection algorithm 41 is a software program that is stored in data storage device 11 of FIG. 2 that is adapted to run on processor 6 of FIG. 2. Alternatively, when processor 6 of FIG. 2 is an ASIC device or a FPGA device, channel selection algorithm 41 is programmed into processor 6.

Figure 5:
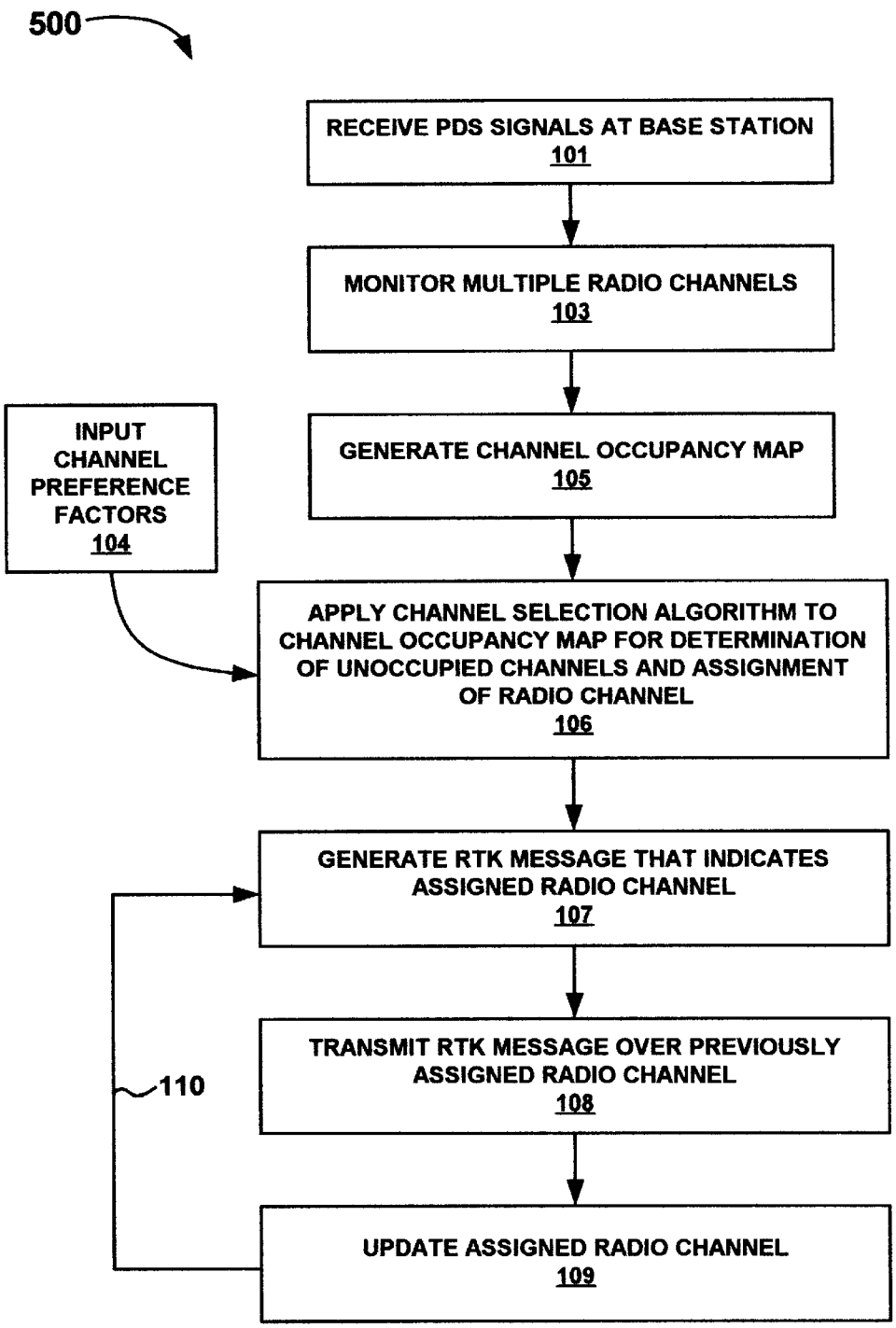
FIG. 5 is a flow chart showing a method for coupling position determining signals from a first position determining system to a second position determining system in accordance with one embodiment of the present claimed invention.

FIG. 5 illustrates a method 500 for coupling a message from a first PDS device (a base station) to a second PDS device (a rover unit) for transmitting messages containing PDS data over unoccupied radio channels. Method 500 is illustrated with respect to the transmission of RTK messages for determining position using RTK methods. However, the method and apparatus of the present invention is well adapted for the transmission of messages adapted for determining position using other methods for determining position.

Continuing with FIG. 5, as shown by step 101, PDS signals are received. In the embodiment shown in FIGS. 1–4, PDS signals are received by PDS receiver 7 via PDS antenna 9 of FIG. 2. In one embodiment, the PDS signals are signals from satellites of the U.S. Global Positioning System (GPS). In such an embodiment, PDS receiver 7 of FIG. 2 is a GPS receiver that couples data from satellites of the GPS to processor 6.

Continuing with FIG. 5, multiple radio channels are monitored as shown by step 103. In the embodiment shown in FIGS. 1–4, scanner 5 monitors multiple radio channels and couples radio traffic received over monitored radio channels to processor 6 of FIG. 2.

Figure 6:
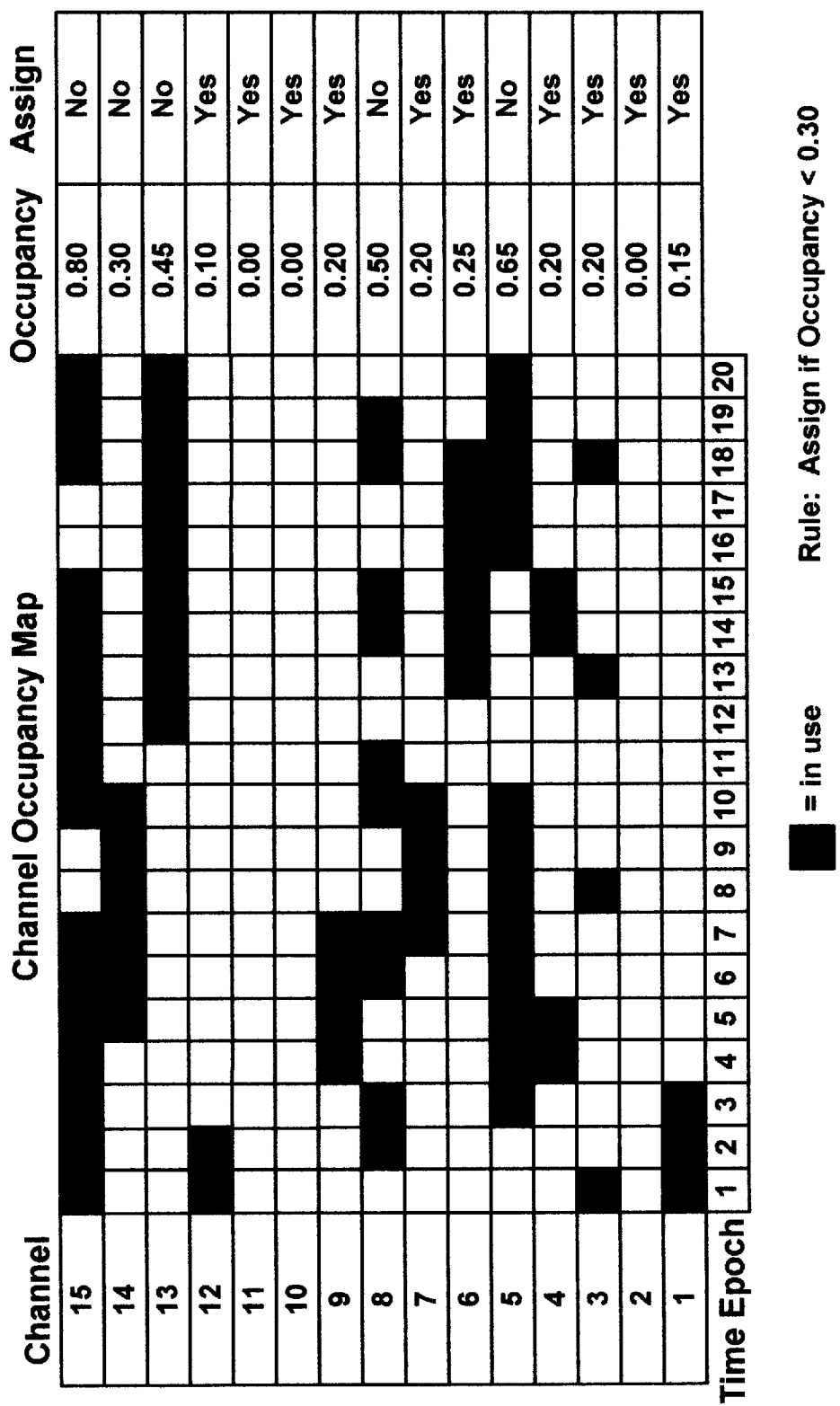
FIG. 6 is a diagram illustrating an exemplary channel occupancy map in accordance with one embodiment of the present claimed invention.

A channel occupancy map is generated as shown by step 105. In the embodiment shown in FIGS. 1–4, channel occupancy map 42 is generated using transmissions received over the radio channels monitored in step 103 of FIG. 5. FIG. 6 shows an exemplary channel occupancy map that reflects the occupancy of channels 1–15 over a 20 second time epoch. The occupancy, expressed as a percentage for each of channels 1–15 is indicated. For example, channel 15 was determined to be occupied 80 percent of the time. In contrast, channels 2, 10, and 11 have an occupancy of zero percent as a result of no communications being detected during any of the monitored time epochs.

Still referring to FIG. 5, in one embodiment, channel preference factors may be input as shown by step 104. In such embodiment, the user can indicate preferred channels and can eliminate channels that are not desired. In the embodiment shown in FIG. 2, channel preference factors are input using input device 10.

Continuing with FIG. 5, as shown by step 106, the channel selection algorithm is applied to the channel occupancy map for determination of unoccupied channels and the assignment of a radio channel. In one embodiment, the channel selection algorithm uses a threshold value for determining whether or not a particular channel is occupied.

Referring now to the channel occupancy map of FIG. 6, an exemplary determination of occupancy is shown under the column marked assign. In this example, the threshold value is 30 percent. Thus, those channels that have an occupancy of less than 30 percent are determined to be unoccupied. In this example, channels 1, 2, 3, 4, 6, 7, 9, 10, 11 and 12 are determined to be unoccupied.

Continuing with step 106 of FIG. 5, once a determination is made as to the channels that are unoccupied, one or more radio channels is assigned from the available unoccupied radio channels. In one embodiment, the first radio channel that is determined to be unoccupied is assigned. Alternatively, when a channel preference factor indicates a preferred channel or channels, the first unoccupied preferred channel is selected.

Referring now to step 107 of FIG. 5, an RTK message is generated that includes an indication of the assigned radio channel. In one embodiment, the indication of the assigned radio channel is simply appended to the body of the RTK message. Though the message generated in step 107 is referred to as a RTK message, any position determining message can be used. The term "position determining message," as used herein, refers specifically to a message that enables a receiving PDS device to determine position using RTK methods and also includes a message that enables a receiving PDS device to determine position using another method for determining position such as, for example, a Differential GPS method, etc.

The RTK message is then transmitted as shown by step 108 of FIG. 5. In the embodiment shown in FIG. 2, the RTK message is transmitted by transmitter 4 via antenna 8. The first transmission is over an assigned home channel. The home channel may be a predetermined channel, or may be input by the user. In one embodiment, the home channel is user selectable using input device 10 of FIG. 2. This allows a surveyor to select the desired home channel according to the nature on the surveying task and local channel usage.

Subsequent transmissions are sent over previously assigned radio channels. That is, reach subsequent transmission will be sent over a radio channel that was previously assigned and transmitted.

Continuing with step 108 of FIG. 5, in one embodiment, a listen-before-transmit feature is used to assure that the selected radio channel is clear immediately prior to the transmission of the RTK message. The listen-before-transmit feature monitors transmissions over the selected channel immediately prior to transmission of the RTK message. This prevents the transmission of the RTK message over other radio traffic.

Referring back to FIG. 5, the assigned radio channel is updated as is shown by step 109. That is, a new channel occupancy map is generated in the same manner as in step 105 that reflects the updated channel occupancy. The channel selection algorithm is applied to the updated channel occupancy map for assigning a new radio channel in the same manner as in step 106.

Continuing with FIG. 5, as shown by line 110, steps 107–109 are repeated for the duration of the survey. More particularly, as shown by step 107, the newly assigned radio channel is indicated in a new RTK message. The new RTK message is then transmitted over the previously assigned radio channel as shown by step 108.

In one embodiment, a RTK message is transmitted each second. The transmission typically takes less than 0.4 seconds to transmit. During the transmission, the assigned radio channel is updated. That is, radio channels are monitored, a channel occupancy map is generated, and the channel selection algorithm is applied for determining unoccupied radio channels and assigning a radio channel. The new radio channel assignment is appended to the RTK message transmission. In one embodiment, transmissions are synchronized to GPS time and each transmission begins at the beginning of each GPS second.

In an alternate embodiment, the assigned radio channel is updated between transmissions of RTK messages. That is, because each RTK message typically takes less than 0.4 seconds to transmit, the assigned radio channel is updated in the 0.6 second time span prior to the next RTK message transmission. More specifically, in the 0.6 second time span between succeeding RTK message transmissions, radio channels are monitored, a channel occupancy map is generated, and the channel selection algorithm is applied for determining unoccupied radio channels and assigning a radio channel. Though step 107 of FIG. 5 shows each RTK message to include an indication of the assigned radio channel, alternatively, the assigned radio channel may be transmitted separately during the time interval between RTK message transmissions. That is, and the example given above, in the remaining 0.6 seconds, radio channels are monitored, a channel occupancy map is generated, the channel selection algorithm is applied for determining unoccupied radio channels and assigning a radio channel, and a separate transmission indicating the assigned radio channel is sent.

The method of FIG. 5 generates a series of RTK messages that indicate assigned radio channels. In the embodiment shown in FIGS. 1–4, the series of RTK messages are generated by processor 6 and are transmitted by transmitter 4. Processor 6 of base station 1 instructs transmitter 4 to move to previously assigned radio channels for each transmission, resulting in base station 2 "hopping" from channel to channel.

Rover unit 1 receives each RTK message and "hops" to the assigned channel to receive the next RTK message. That is, in the embodiment shown in FIG. 3, rover unit 2 receives a new channel assignment with each RTK message that is received by radio transceiver 33. Processor 6 of rover unit 2 then generates an instruction that is transmitted to radio transceiver 33 that instructs radio transceiver 33 to tune to the appropriate channel.

In one embodiment, rover unit 2 of FIG. 3 transmits a signal that confirms the receipt of each RTK message. This confirmation signal is received by base station 1 and is used to assure that rover unit 2 is properly following the base station as it hops from channel to channel. In one embodiment, because both rover unit 2 and base station 1 of FIGS. 1–3 transmit and receive data, a method for preventing data loss from signal-interference is used. In one embodiment, Time Division Multiple Access (TDMA) methods are used to prevent data loss from signal interference. Other methods may also be used to prevent data loss from signal interference.

Figure 7:
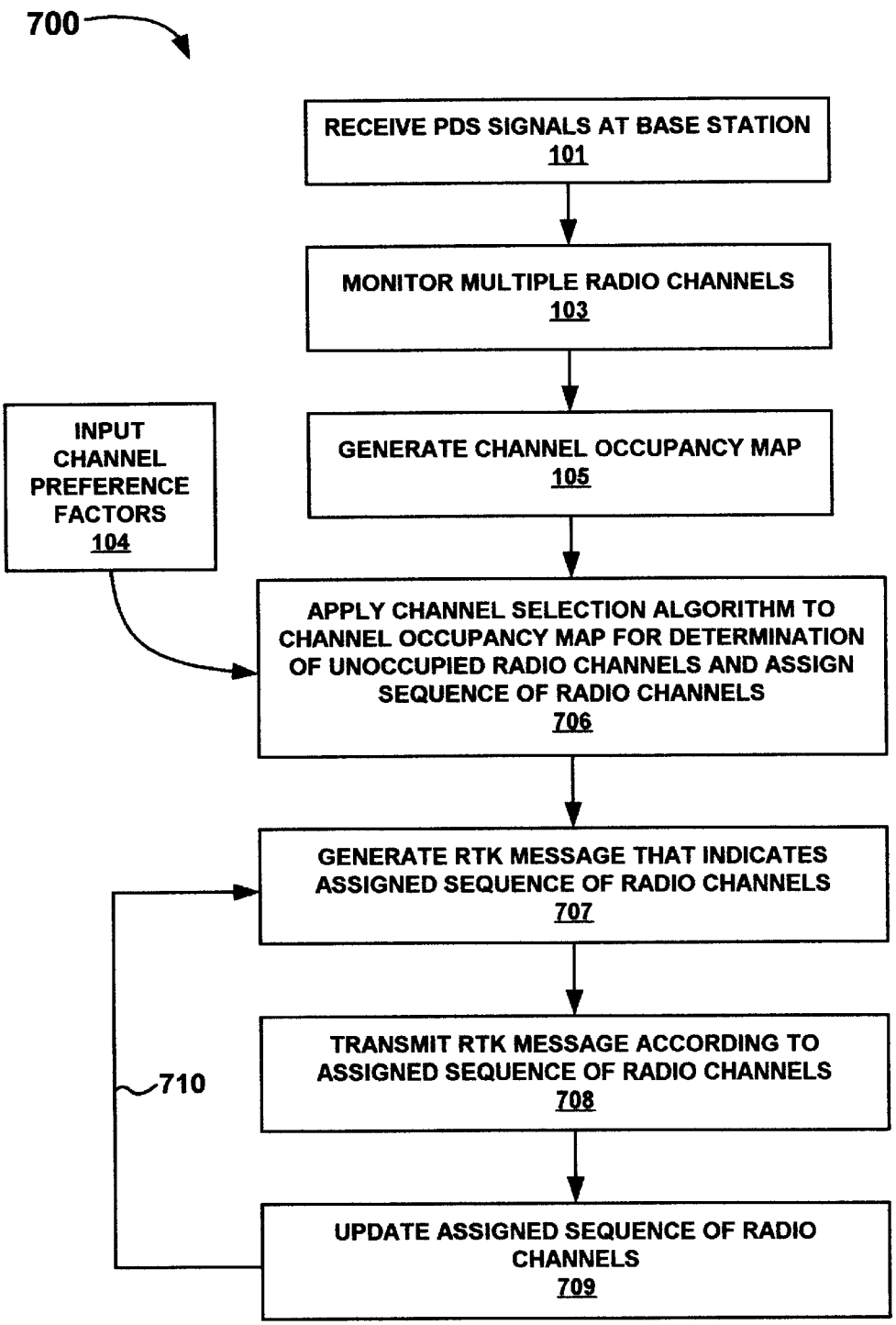
FIG. 7 is a flow chart showing a method for coupling position determining signals from a first position determining system to a second position determining system that includes the assignment of multiple radio channels in accordance with one embodiment of the present claimed invention.

In an alternate embodiment that is shown in FIG. 7, multiple radio channels are assigned. Each time a survey is to be performed, PDS signals are received at the base station as shown by step 101, multiple radio channels are monitored as shown by step 103, channel preference factors are input as shown by step 104, and a channel occupancy map is generated as shown by step 105.

As shown by step 706 of FIG. 7, the channel selection algorithm is applied to the channel occupancy map determined in step 105 for determination of available channels. Multiple radio channels are then assigned. In one embodiment, a sequence of 30 radio channels are assigned.

Referring now to step 707 of FIG. 7, an RTK message is generated that indicates the sequence of radio channels assigned in step 706. The RTK message is transmitted as shown by step 708 according to the previously assigned sequence of radio channels. In one embodiment, 30 radio channels are assigned for each thirty second time period and transmissions are initiated at the beginning of each GPS second. This gives a series of 30 radio channels for each thirty second time period, with one channel assigned to each GPS second.

As shown by step 709 of FIG. 7, the assigned radio channels are updated. That is, a new channel occupancy map is generated in the same manner as in step 105 that reflects the updated channel availability. The channel selection algorithm is applied to the updated channel occupancy map for determining available channels in the same manner as in step 706 and a new sequence of radio channels are assigned.

Continuing with FIG. 7, as shown by line 710, steps 707–709 are repeated for the duration of the survey. More particularly, as shown by step 707, the sequence of assigned radio channels is indicated in a new RTK message. The new RTK message is then transmitted over the previously assigned radio channels as shown by step 708.

Method 700 of FIG. 7 provides for the generation of sequences of assigned radio channels. This allows the receiving rover unit to operate independently from the time that a sequence of radio channels is received until such time that a new sequence is transmitted. This method provides for a more reliable link between the base station and the rover unit because the failure to receive a single transmission will likely not result in a loss of connection. That is, because a sequence of radio channels is transmitted, updates to the sequence can be obtained by a rover unit prior to the "hop," resulting in multiple opportunities for communication of updates to the sequence before the base station moves to the newly assigned channels.

Referring now to both method 500 of FIG. 5 and method 700 of FIG. 7, determination of occupancy and assignment of channels can be performed using any of a number of different methods. In one embodiment, a channel selection algorithm is utilized that uses channel exclusion. That is, once it is determined that a particular channel is occupied, that channel is excluded from the selection process for a predetermined time interval. In one embodiment, the channel selection algorithm excludes channels on which voice usage is detected for a time period of 5 to 20 seconds. This avoids transmission interruptions from voice users in congested areas, particularly when the same channel is used by multiple voice users.

Continuing with FIGS. 5 and 7, though the monitoring of prior channel occupancy gives a good indication of future channel occupancy, because each channel assignment is used for a subsequent transmission, with a time period of approximately 0.6 seconds or more until the subsequent transmission, there is a likelihood that a voice user will initiate a transmission during the-intervening time period and/or during the subsequent RTK message transmission. In one embodiment, predicted occupancy is calculated and is used for channel assignment. Predicted occupancy indicates, in percentage terms, the likelihood of voice transmission during the intervening time period and/or during the subsequent RTK message transmission. This predicted occupancy is then applied to the channel occupancy map for assigning a radio channel.

In one embodiment, a probability density model is constructed by scanning all the channels and assigning a predicted occupancy for each channel for 1-second, 5-second, and 10-second time periods. This gives an indication as to whether each channel will be occupied during the subsequent transmission that corresponds to the current channel assignment.

One simple method for determining a predicted occupancy for each channel uses the compliment of occupancy as an indication of predicted occupancy. In this embodiment, the percentage occupancy is determined for each channel during the period that the channel is monitored. The percentage occupancy is subtracted from one to obtain the compliment. Channels are then chosen that have a compliment that is less than or equal to a predicted occupancy threshold. In one embodiment, a predicted occupancy threshold of 0.5 is used. FIG. 8 shows an example in which ten channels are scanned, shown in row 801 as channels 1–10. In this example, occupancy of each channel is shown as a percentage in row 802. Row 803 shows the corresponding compliment for each of channels 1–10. When a predicted occupancy threshold of 0.5 is used, only channels 1–3, 3, 7, and 10 can be chosen as assigned channels as is shown in row 804.

In one embodiment, a predetermined maximum consecutive assignment value is used in conjunction with predicted occupancy for channel assignment. The number of times that a particular channel is consecutively assigned is determined and is compared with the maximum consecutive assignment value. When the number of times that a particular channel is consecutively assigned equals the maximum consecutive assignment value, the particular channel is not assigned. Rather, the next sequential channel that is indicated by the probability density model is assigned. This keeps the method and apparatus of the present invention moving from channel to channel, preventing excessive use of any particular channel.

In an alternate embodiment, channel occupancy maps are saved and used during subsequent periods for facilitating channel assignments, In one embodiment, if an evaluation of prior channel occupancy maps determines that the voice occupancy does not change much in a given area over a given time period, a hopping sequence is created for that time period and is used during each subsequent time period. The time period used may be, for example, daily, or hourly. The created hopping sequence is then perfected using a statistical usage model. For example, if voice usage picks up each afternoon on one or more channels, the hopping sequence is modified using the statistical usage model. The modified hopping sequence can then be used in subsequent time periods. In one embodiment, the method and apparatus of the present invention generates a daily statistical usage model on the first day of use in a particular area. This daily statistical usage model is then used for generating hopping sequences for subsequent days, and is perfected by updates to the statistical usage model during the entire time that the base station is used in a particular location.

In yet another embodiment, the channel selection algorithm determines channel occupancy based on the following factors: local repeater frequencies; regulatory regions; received signal strength indicators of voice transmissions; squelch outputs and squelch levels of voice transmissions; and statistical measures of signal (or noise) measurements.

Figure 9:
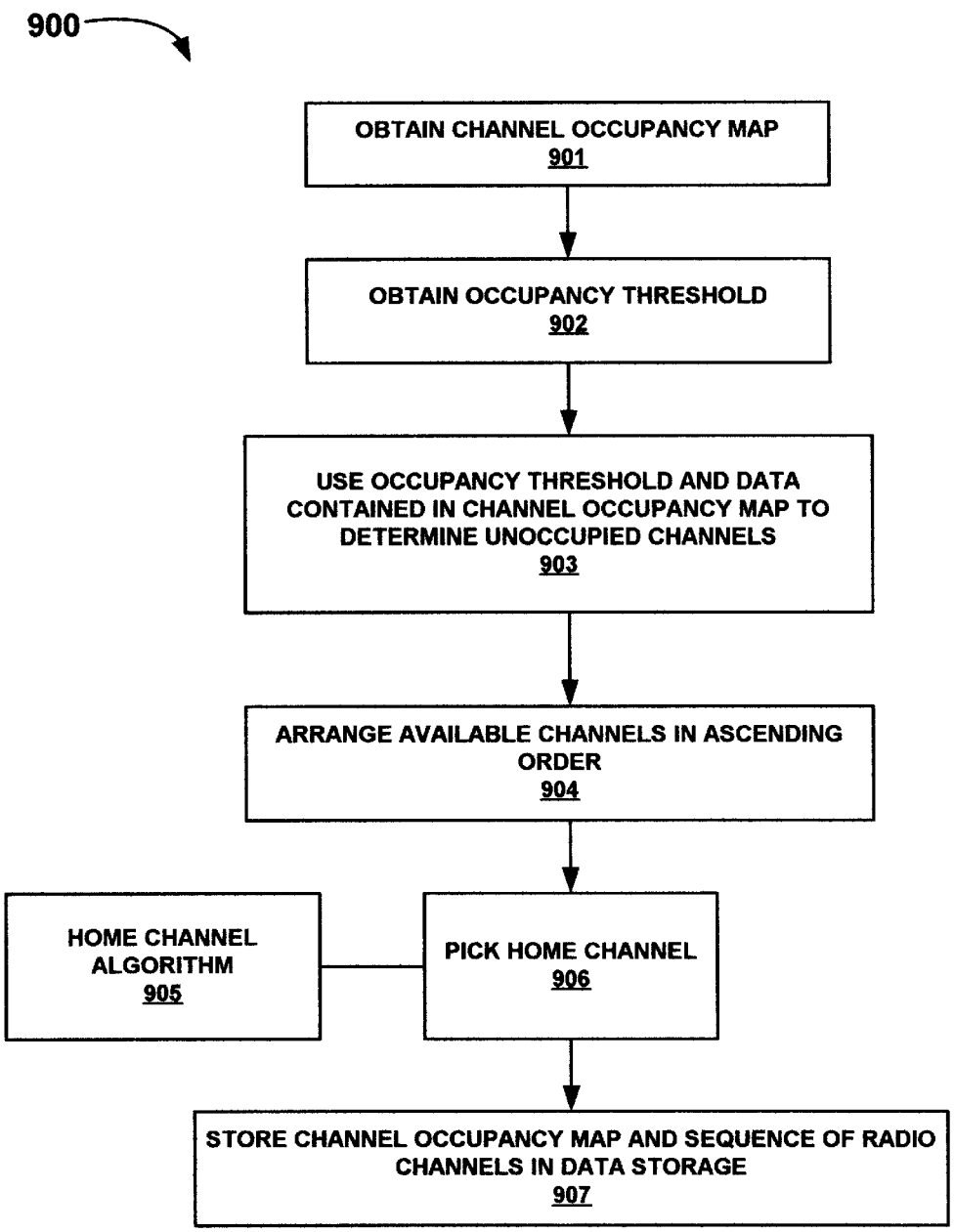
FIG. 9 is a flow chart illustrating an exemplary channel selection algorithm in accordance with one embodiment of the present claimed invention.

FIG. 9 shows flow chart 900 for selecting a sequence of unoccupied channels in accordance with one embodiment of the present invention. As shown by step 901 a channel occupancy map is obtained. In one embodiment, the channel occupancy map is obtained by retrieving, from memory storage, the data representing the channel occupancy map.

Continuing with FIG. 9, as shown by step 902, an occupancy threshold is obtained. In one embodiment, when an occupancy threshold is input as a channel preference factor in step 104 of FIG. 5, the occupancy threshold is stored in memory storage. Alternatively, a default channel occupancy threshold that is stored in memory storage is used. In either event, the desired occupancy threshold is obtained.

As shown by step 903, the occupancy threshold is applied to the data in the occupancy map to determine channels that are unoccupied. Then, as shown in step 904, channels that are determined to be unoccupied in step 903 are organized in ascending order. That is, the channels are organized from the lowest channel number to the highest channel number.

Continuing with FIG. 9, a home channel algorithm 905 is used to pick a home channel, as shown by step 906. In one embodiment, the home channel is selected by picking the channel having the lowest channel occupancy in the last measurement period. Alternatively, the home channel is selected by picking the lowest channel number of those channels that are determined to be unoccupied. That is, in one embodiment, the first channel in the sequence of radio channels obtained from step 904 is designated as the home channel.

Continuing with FIG. 9, the channel map is then stored as the "current map" in data storage and the sequence of radio channels obtained from step 904 is then stored in memory storage as shown by step 907. In one embodiment, the sequence of radio channels obtained from step 904 is stored in a storage registers designated as "TEMP STORAGE."

Figure 10:
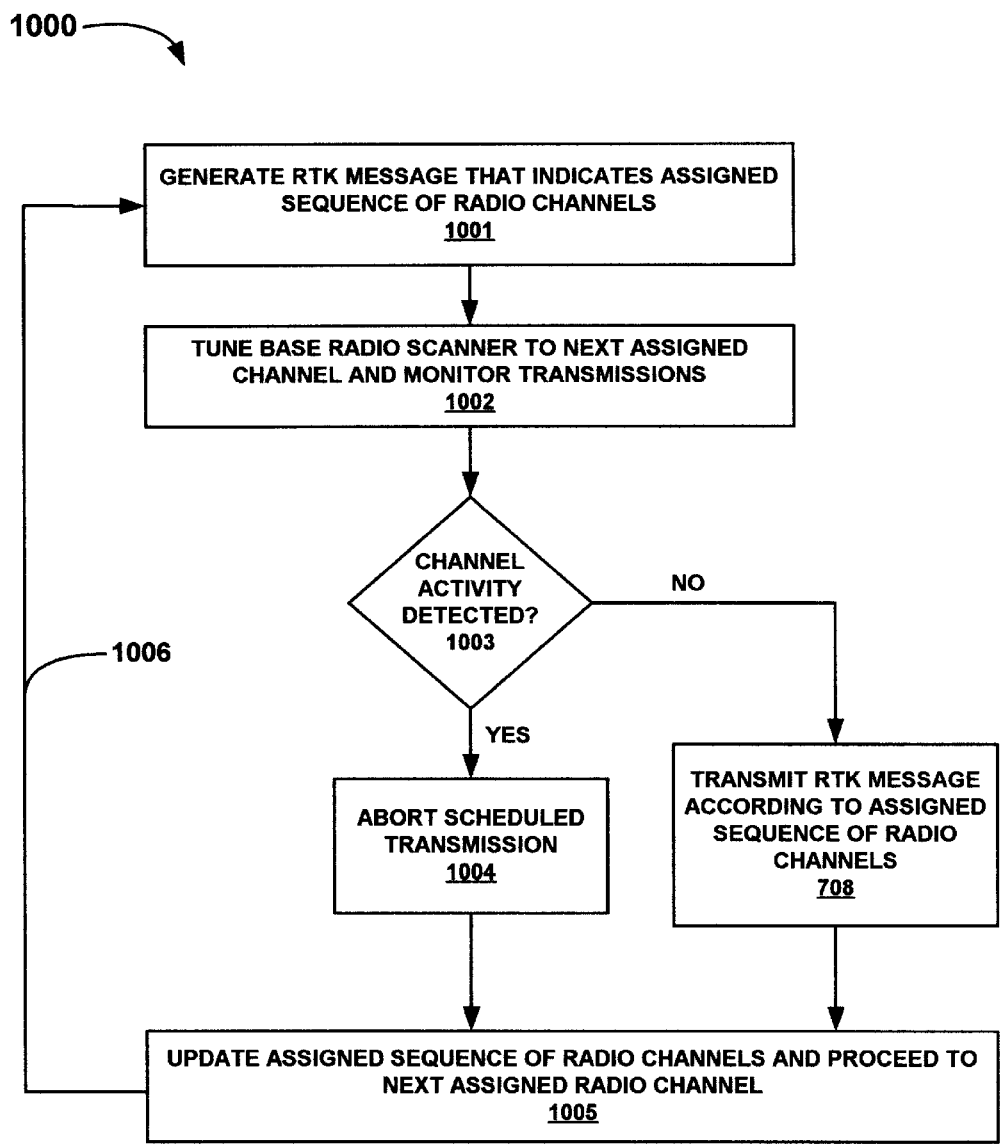
FIG. 10 is a flow chart illustrating an exemplary method for coupling position determining signals from a first position determining system to a second position determining system that includes the assignment of multiple radio channels in accordance with one embodiment of the present claimed invention.

In yet another embodiment that is shown in flow chart 1000 of FIG. 10, a "last second" listen test is used to assure that all transmissions are over unoccupied radio channels.

As shown by step 1001, a RTK message is generated that indicates the updated assigned sequence of radio channels. As shown by step 1002, the base station's radio scanner is then tuned to the next assigned channel and transmissions over the next assigned channel are monitored. If channel activity is not detected, as shown by steps 1003 and 708, the RTK message is transmitted according to the assigned sequence of radio channels. However, as shown by steps 1003 and 1004, if channel activity is detected, the scheduled transmission will be aborted.

Continuing with FIG. 10, as shown by step 1005, the assigned sequence of radio channels are updated and the process proceeds to the next assigned radio channel. More particularly, the process moves to the next assigned channel in the previously determined sequence of radio channels and a new channel occupancy map is generated in the same manner as in step 105 that reflects the updated channel availability. The channel selection algorithm is applied to the updated channel occupancy map for determining available channels in the same manner as in step 706 and a new sequence of radio channels are assigned.

Continuing with FIG. 10, as shown by line 1006, the process beginning with step 1001 is repeated for the duration of the survey. This results in aborted transmissions when channel activity is detected in step 1003. However, since transmissions are initiated each second, the abortion of a single transmission does not significantly affect the operation of the system. Yet, by monitoring the channel and aborting transmission when radio traffic is detected, the method and apparatus of the present invention does not walk over other radio traffic.

Figure 11:
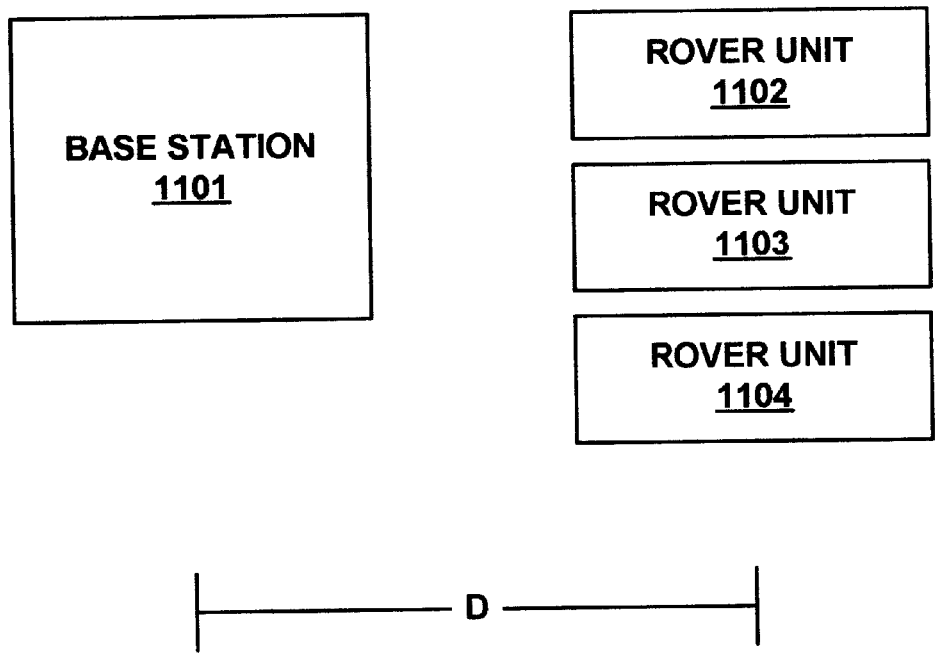
FIG. 11 is a diagram illustrating a base station that is in close proximity to multiple rover units in accordance with one embodiment of the present claimed invention.
Figure 12:
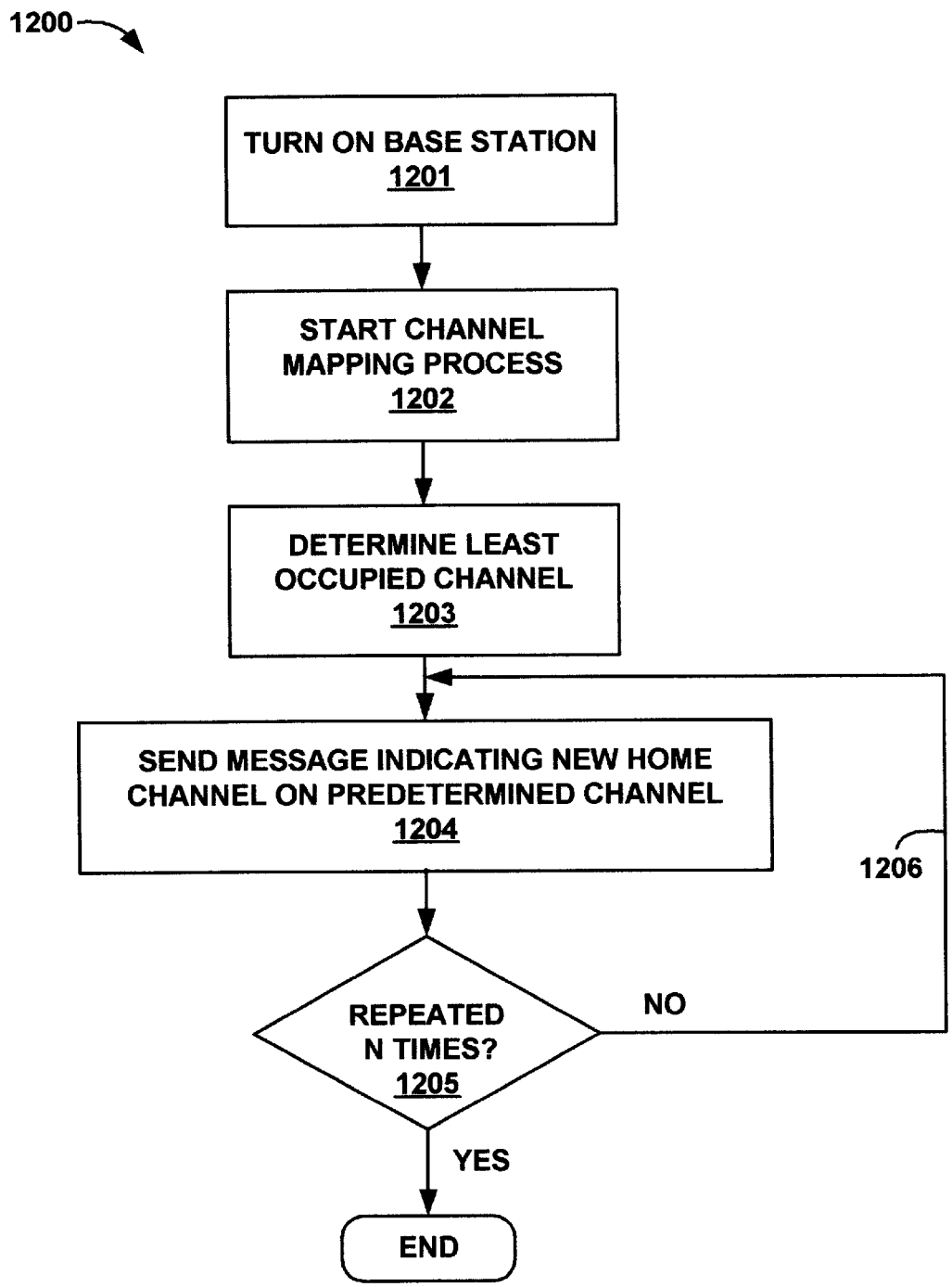
FIG. 12 is a flow chart illustrating an exemplary initialization process for a base station in accordance with one embodiment of the present claimed invention.
Figure 13:
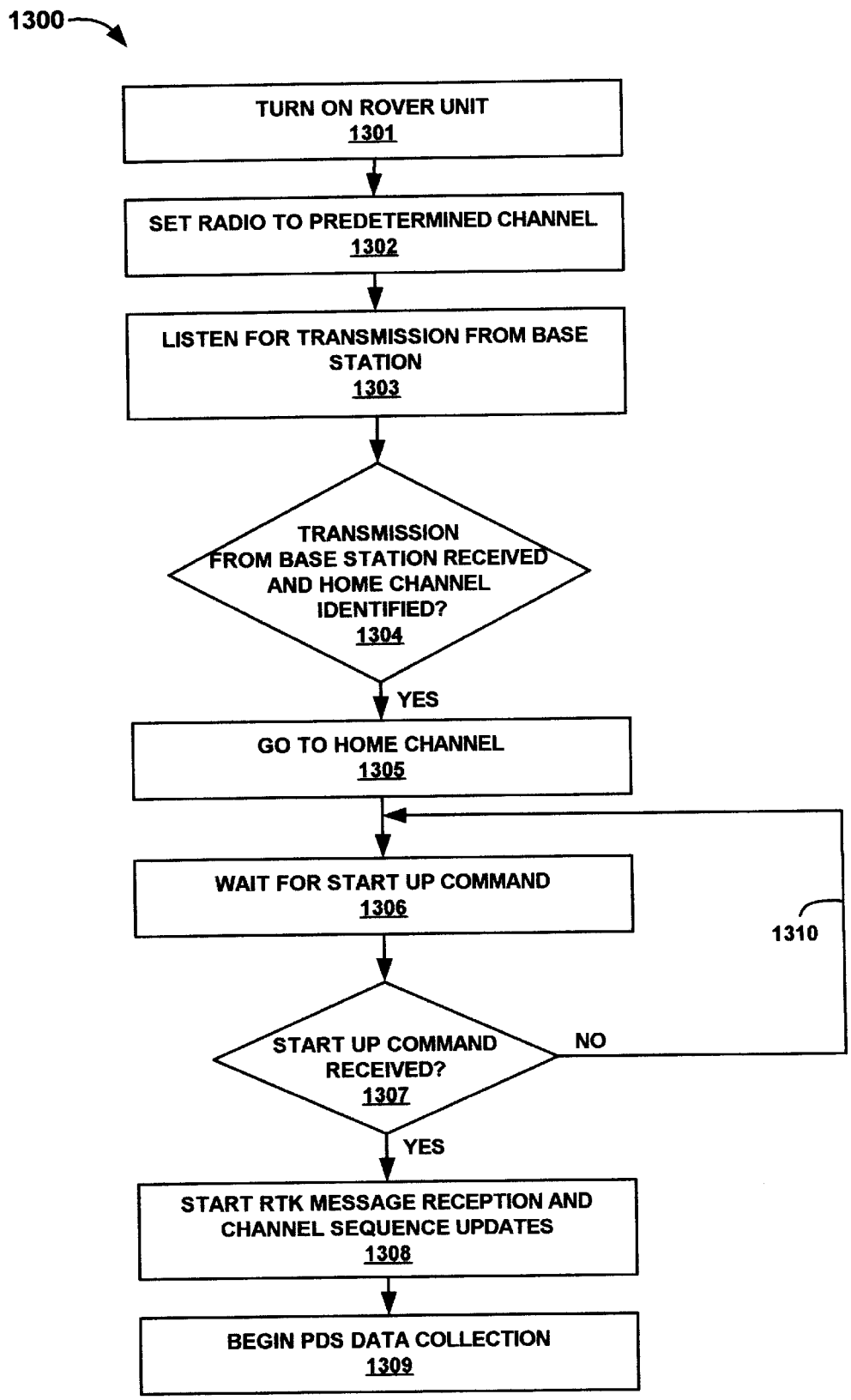
FIG. 13 is a flow chart illustrating an exemplary initialization process for a rover unit in accordance with one embodiment of the present claimed invention.

FIGS. 11–13 show a specific embodiment in a base station and rover units are initialized. FIG. 11 shows base station 1101 and rover units 1102–1104 that are located a short distance, shown as distance D, from base station 1101. When the rover units 1102–1104 are brought within distance D, during an initialization process, each of rover units 1102–1104 will be initialized according to the method shown in flow chart 1200 of FIG. 12.

Now referring to flow chart 1200 of FIG. 12, once the base station is turned on, as shown by step 1201, the base station begins a channel mapping process as shown by step 1202. In one embodiment, the base station moves from channel to channel, creating a channel occupancy map, for a period of 1 to 5 minutes. As shown by step 1203, the least occupied channel is determined. As shown by step 1204, a message indicating the new home channel is then transmitted over a predetermined channel. In one embodiment, the message is "blasted" over the predetermined channel irregardless of other radio traffic. The message transmitted in step 1204 is repeated a designated number of times, shown as "N" times, as shown by step 1205 and line 1206. In one embodiment, N is set at between one and one hundred.

Now referring to flow chart 1300 of FIG. 13, the steps performed by a rover unit are shown. As shown by step 1301 a rover unit is turned on. As shown by step 1302, the radio is set to the predetermined channel used in step 1204 of FIG. 12. Then, as shown by step 1303, the rover unit listens for the transmission from base station of step 1204. Once the transmission of step 1204 is received by the rover unit, and a new home channel is identified, as shown by step 1304, the rover unit goes to the new home channel, as shown by step 1305.

The rover unit then waits, as shown by step 1306–1307 and line 1310, for a START-UP command. Once a START-UP command is received, as shown by step 1307–1308, the rover unit begins receiving RTK messages and channel sequence updates. The rover unit then begins PDS data collection as shown by step 1309.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for coupling a position determination message from a first Position Determination System (PDS) device to a second PDS device comprising:

a) monitoring, at said first PDS device, radio transmissions over a plurality of radio channels for assigning a radio channel that is unoccupied;

b) generating a position determination message at said first PDS device, said position determination message indicating said assigned radio channel;

c) transmitting to said second PDS device said position determination message from said first PDS device, said position determination message comprises position data for utilization by said second PDS device;

d) updating said assigned radio channel periodically such that said assigned radio channel indicates an unoccupied radio channel; and e) repeating b) through d) such that subsequent position determination messages are transmitted over unoccupied radio channels.

2. A method for coupling a position determination message from a first PDS device to a second PDS device as recited in claim 1 wherein a) further includes:

a1) generating a channel occupancy map; and a2) applying a channel selection algorithm to said channel occupancy map for determining said assigned radio channel.

3. A method for coupling a position determination message from a first PDS device to a second PDS device as recited in claim 2 wherein said channel selection algorithm uses the compliment of the percentage occupancy of each radio channel for assigning a radio channel.

4. A method for coupling a position determination message from a first PDS device to a second PDS device as recited in claim 2 wherein a2) further includes: excluding those channels over which a transmission is detected from the selection process for a predetermined amount of time.

5. A method for coupling a position determination message from a first PDS device to a second PDS device as recited in claim 2 wherein said position determination message is a Real-Time Kinematics (RTK) message, said method further comprising:

receiving said RTK message at said second PDS device;

receiving PDS signals at said second PDS device;

determining position of said second PDS device using said PDS signals received at said second PDS device and using said RTK message; and monitoring said assigned radio channel at said second PDS device for receiving a subsequent RTK message.

6. A method for coupling a position determination message from a first PDS device to a second PDS device as recited in claim 2 wherein said channel selection algorithm uses predicted occupancy for assigning a radio channel.

7. A method for coupling a position determination message from a first PDS device to a second PDS device as recited in claim 2 wherein said channel selection algorithm determines the number of consecutive assignments for an assigned channel and assigns a different channel when the number of consecutive assignments has reached a predetermined threshold.

8. A method for coupling a position determination message from a first PDS device to a second PDS device as recited in claim 1 wherein a) further includes:
   a1) inputting channel preference factors;
   a2) generating a channel occupancy map; and
   a3) applying a channel selection algorithm and said channel preference factors to said channel occupancy map for determining said assigned radio channel.

9. A method for coupling a position determination message from a first PDS device to a second PDS device as recited in claim 1 wherein PDS signals are received at said first PDS device, and wherein said position determination message is transmitted at a predetermined time interval, said predetermined time interval synchronized with the time indicated by said received PDS signals.

10. A method for coupling a position determination message from a first PDS device to a second PDS device as recited in claim 9 wherein said predetermined time interval is approximately one second.

11. A method for coupling a position determination message from a first PDS device to a second PDS device as recited in claim 9 wherein said first PDS device is adapted to receive a confirmation message from said second PDS device, and wherein, if said confirmation message is not received within a predetermined time interval after the transmission of said position determination message, the next position determination message is transmitted over a home channel.

12. A method for coupling a position determination message from a first Position Determination System (PDS) device to a second PDS device comprising:
   a) monitoring radio transmissions over a plurality of radio channels for assigning a sequence of radio channels that are unoccupied;
   b) generating a position determination message at said first PDS device, said position determination message indicating said sequence of assigned radio channels;
   c) transmitting to said second PDS device said position determination message from said first PDS device over one of said plurality of radio channels as indicated by said sequence of assigned radio channels, said position determination message comprises position data for utilization by said second PDS device;
   d) updating said sequence of assigned radio channels; and
   e) repeating b) through d) so as to transmit said position determination message over a radio channel that is unoccupied.

13. A method for coupling a position determination message from a first PDS device to a second PDS device as recited in claim 12 wherein a) further includes:
   a1) generating a channel occupancy map; and
   a2) applying a channel selection algorithm to said channel occupancy map for determining said sequence of assigned radio channels.

14. A method for coupling a position determination message from a first PDS device to a second PDS device as recited in claim 13 wherein a2) further includes: excluding from the selection process for a predetermined amount of time those channels over which a transmission is detected.

15. A method for coupling a position determination message from a first PDS device to a second PDS device as recited in claim 13 wherein a2) further comprises:
   a2i) determining a predicted occupancy for each of said plurality of radio channels; and
   a2ii) determining said sequence of radio channels using said predicted occupancy.

16. A method for coupling a position determination message from a first PDS device to a second PDS device as recited in claim 12 wherein a) further includes:
   a1) inputting channel preference factors;
   a2) generating a channel occupancy map that indicates the usage of one of said plurality of radio channels; and
   a3) applying a channel selection algorithm and said channel preference factors to said channel occupancy map for determining said sequence of assigned radio channels.

17. A method for coupling a position determination message from a first PDS device to a second PDS device as recited in claim 12 wherein PDS signals are received at said first PDS device, and wherein c) further comprises:
   c1) transmitting said position determination message at a predetermined time interval, said predetermined time interval synchronized with the time indicated by said PDS signals.

18. A method for coupling a position determination message from a first PDS device to a second PDS device as recited in claim 17 wherein said predetermined time interval is approximately one second.

19. A method for coupling a position determination message from a first PDS device to a second PDS device as recited in claim 12 wherein said position determination message is a Real-Time Kinematics (RTK) message, said method further comprising:
   e) receiving said RTK message at said second PDS device;
   f) receiving PDS signals at said second PDS device;
   g) determining position of said second PDS device using said PDS signals received at said second PDS device and using said RTK message; and
   h) monitoring one of said assigned sequence of radio channels at said second PDS device for receiving a subsequent RTK message.

20. A Position Determining System (PDS) device for coupling PDS data to other PDS devices comprising:
   a) a receiver adapted to receive PDS signals;
   b) a scanner for receiving a plurality of radio channels, said scanner adapted to monitor radio transmissions over said plurality of radio channels;
   c) a channel selection algorithm, said channel selection algorithm adapted to assign a radio channel that is unoccupied; and
   d) a radio transmitter for transmitting radio signals over said plurality of radio channels, said radio transmitter adapted to transmit a position determination message to said other PDS devices, said position determination message comprises position data for utilization by said other PDS devices and indicating said assigned radio channel.

21. A method for coupling a position determination message by radio from a first Global Positioning System (GPS) device to a second GPS device comprising:
   a) monitoring, at said first GPS device, radio transmissions over a plurality of radio channels for assigning a radio channel that is unoccupied;

b) generating a position determination message at said first GPS device, said position determination message indicating said assigned radio channel;

c) transmitting said position determination message from said first GPS device to said second GPS device, said position determination message comprises position data for utilization by said second GPS device; and d) updating said assigned radio channel periodically such that said assigned radio channel indicates an unoccupied radio channel; and e) repeating b) through d) such that subsequent messages are transmitted over unoccupied radio channels.

22. A method for coupling a message by radio from a first GPS device to a second GPS device as recited in claim 21 wherein a) further includes:

a1) generating a channel occupancy map; and a2) applying a channel selection algorithm to said channel occupancy map for determining said assigned radio channel.

23. A method for coupling a message by radio from a first GPS device to a second GPS device as recited in claim 22 wherein said channel selection algorithm uses the compliment of the percentage occupancy of each radio channel for assigning a radio channel.

24. A method for coupling a message by radio from a first GPS device to a second GPS device as recited in claim 22 wherein a2) further includes: excluding those channels over which a transmission is detected from the selection process for a predetermined amount of time.

25. A method for coupling a message by radio from a first GPS device to a second GPS device as recited in claim 22 wherein said channel selection algorithm uses predicted occupancy for assigning a radio channel.

26. A method for coupling a message by radio from a first GPS device to a second GPS device as recited in claim 22 wherein said channel selection algorithm determines the number of consecutive assignments for an assigned channel and assigns a different channel when the number of consecutive assignments has reached a predetermined threshold.

27. A method for coupling a message by radio from a first GPS device to a second GPS device as recited in claim 21 wherein a) further includes:

a1) inputting channel preference factors;

a2) generating a channel occupancy map; and a3) applying a channel selection algorithm and said channel preference factors to said channel occupancy map for determining said assigned radio channel.

* * * * *